UNITED STATES PATENT OFFICE.

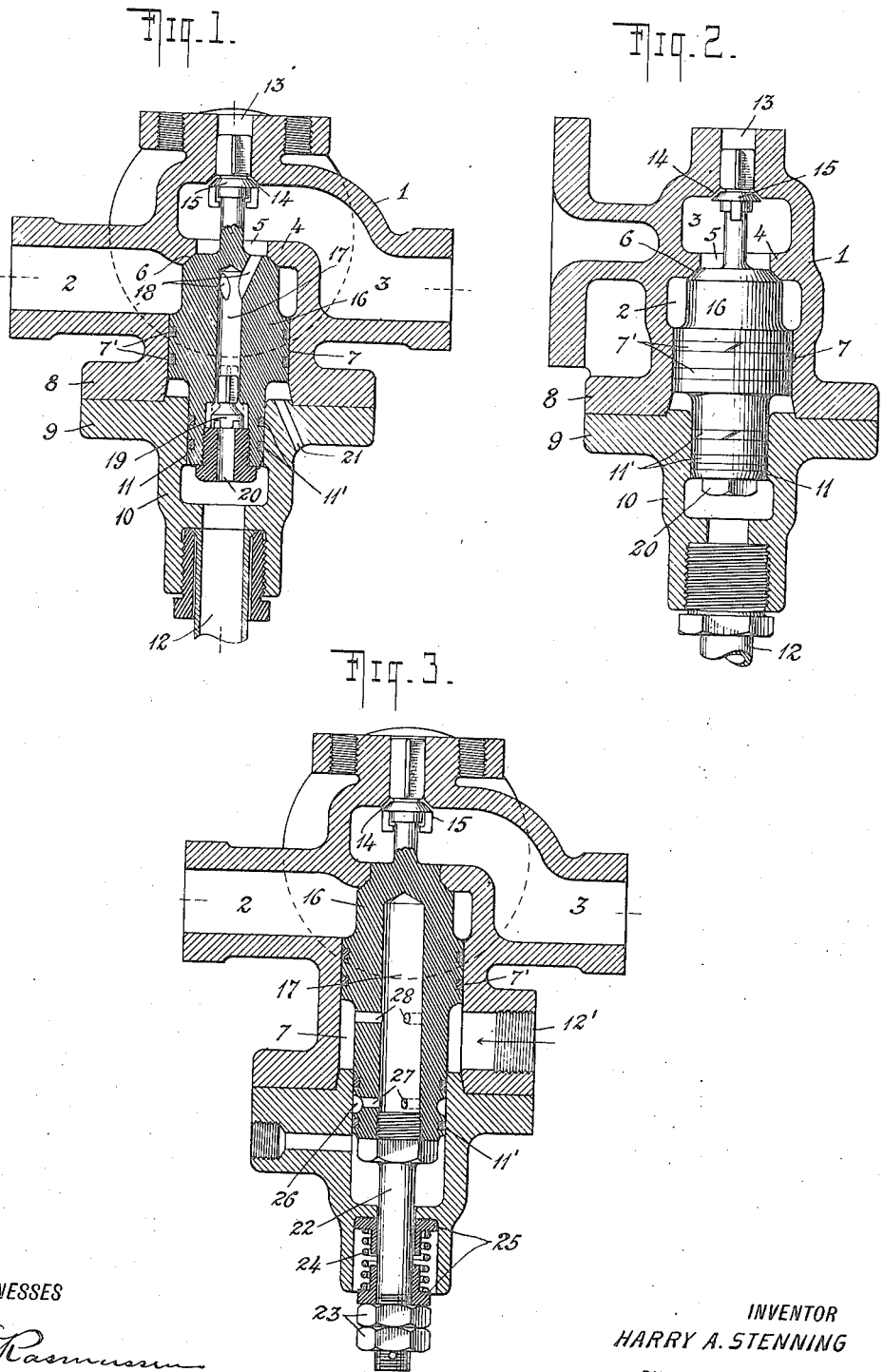

HARRY ALEXANDER STENNING, OF LONDON, ENGLAND, ASSIGNOR TO LOCOMOTIVE SUPERHEATER COMPANY, OF NEW YORK, N. Y., A CORPORATION OF DELAWARE.

COMBINED BY-PASS VALVE AND CONTROLLING DEVICE FOR ENGINE-CYLINDERS.

1,206,266.

Specification of Letters Patent.

Patented Nov. 28, 1916.

Application filed April 17, 1915. Serial No. 22,211.

*To all whom it may concern:*

Be it known that I, HARRY ALEXANDER STENNING, a subject of the King of England, and a resident of the city of London, England, have invented certain new and useful Improvements in a Combined By-Pass Valve and Controlling Device for Engine-Cylinders, of which the following is a specification.

My invention is particularly applicable to locomotives where the cylinder ends, on each side of the piston, are joined by a pipe containing a by-pass valve, said valve being arranged so as to be either opened or closed according to the working conditions. With the valve open any pressure differences tending to establish themselves on opposite sides of the piston immediately equalize.

In my Patent Number 1179468 dated April 18, 1916, I disclosed a fluid operated controlling device for a by-pass valve placed in a connecting pipe as above set forth, the device being adapted to be moved in one direction by steam flowing from the steam chest or main steam pipe, and in the other direction by steam supplied independently of the main steam pipe as, for example, by a pipe leading directly from the boiler. In the application just referred to the controlling device took the form of a piston inclosed in a suitable cylinder, the two steam connections referred to being arranged so as to act upon opposite sides of the piston.

My invention now to be described is an improvement on the controlling device and by-pass valve of the just mentioned prior application, and has for its object to reduce the required number of steam connections. This object I attain by an improved construction as will be seen hereinafter.

My invention resides in a construction and arrangement of controlling device and by-pass valve of the general type disclosed in my prior application, such that the operation of the device is effected by the use of but a single steam connection, preferably from the valve chest or main steam pipe.

My invention will be better understood by referring to the accompanying drawings in which—

Figure 1 represents a central vertical longitudinal section through a preferred form thereof; Fig. 2 a similar transverse section through the same form; and Fig. 3 a section, similar to Fig. 1, through a modified form of my invention.

Referring to Figs. 1 and 2, the valve body or shell comprises a casing 1 and a cap 10. This casing 1 is provided with passages 2 and 3 whose outer ends are provided with flanges or the equivalent, for connection to pipes leading to opposite ends of the engine cylinder. The inner ends of these passages are disposed one above the other so as to have a separating partition wall 4 having a circular connecting passage 5 which is provided with a, preferably conical, valve seat 6 at its lower end. The bottom of the lower passage 2 has a bore 7, coaxial with the valve seat, provided with a terminal flange 8 to which is fixed a corresponding flange 9 of the terminal cap 10. In this cap is a bore 11, also coaxial with the valve seat, but of smaller diameter than the bore 7. The bottom of the cap is centrally bored for a pipe connection 12 leading directly to the steam chest or main steam pipe. In the upper wall passage 3, and coaxial with the valve seat 6, is a small cylindrical bore 13 which, by means of a suitable pipe connection, not shown, communicates with the atmosphere; this bore is provided with a valve seat 14 for a relief valve 15 which is carried at the upper end of a spindle forming part of a valve 16 of stepped cylindrical form and having packing rings 7' and 11' which coöperate with the bores 7 and 11 respectively. The valve 16 is provided with a central hollow space 17, the upper end of which terminates somewhat short of the valve seat 6 and is connected by three passages 18 with the opening 5. The lower end of space 17 opens into an enlargement of bore 11 but is adapted to be closed by a supplementary wing valve 19 which is retained in position by a hollow nut 20; this nut may also be used to regulate the lift of the valve. In the cap 10 is a small bore hole 21 which connects bore 7 with the atmosphere, thus providing for a dash pot action which will prevent hammering of the working faces of the valve during the operation thereof.

The operation of my invention is as follows: When the throttle is open and steam is being supplied to the engine cylinders, steam will also enter the lower end of cap 10 through the pipe 12; its pressure will close the supplementary valve 19 so as to act upon the lower end of main valve 16 and force it against valve seat 6, thus closing opening 5 and cutting off the connection between the two cylinder ends; relief valve 15 will also close. The engine cylinder and piston will, therefore, operate normally. When, however, the throttle is closed and the steam supply to the engine cylinder is cut off, the main valve 16 will drop, owing either to gravity or by reason of compression in the cylinders transmitted through passages 2 and 3, or both, thus restoring the communication between passages 2 and 3 and equalizing the pressures at the two ends of the cylinder; relief valve 15, being simultaneously opened, both the cylinder ends will also open to the atmosphere through bore 13 and its pipe connection.

A large percentage of locomotives are now provided with superheaters and various arrangements have been proposed in such cases for sending a small quantity of steam through the superheater elements, to prevent overheating thereof, when the main steam supply to the cylinders is cut off. In such circumstances this supplementary steam supply will pass into the controlling device as just described, the pressure of this steam being insufficient to close the supplementary valve. The steam will pass up the central hollow space 17 and through the passages 18 and thence as before, through bore 13 to the atmosphere.

Instead of relying upon gravity or compression in the cylinder to lower the valve 17 and open communication between passages 2 and 3 a construction such as shown in Fig. 3 may be adopted. Here the lower end of valve 17 is formed as a stem 22, the supplementary valve 19 being dispensed with. This stem passes through the bottom of cap 10 and has a pair of check nuts 23 threaded upon its end; between these nuts and the bottom of the cap in a recess thereof is a spiral opening 24 under compression. A pair of flanged washers 25 take the direct thrust of the spring ends. By adjusting the nuts 23 the degree of compression of the spring may be varied. In this modified form of my invention the connection to the main steam pipe or valve chest instead of being brought through the bottom of the cap is arranged laterally as at 12′ so as to open directly into bore 7. An annular groove 26 is formed upon the smaller diametered step of valve 16 near its lower end between the packing rings 11′ and is connected by radial passages 27 with the central hollow space 17 and thence by other radial passages 28 to the bore 7 which is in communication with the steam supply. The operation of this form of my invention is as follows: When steam is being supplied to the engine cylinders steam from the valve chest or main steam pipe enters the bore 7 through pipe connection 12′ and forces the valve upwardly so as to close the relief valve 15 and the connection between passages 2 and 3. During the operation the spring on the lower end of the valve spindle is compressed. When the steam supplied to the engine cylinder is cut off so as to withdraw the pressure on the lower side of the valve the spring again extends and opens the two valves. In such constructions as provide a small supply of steam through the superheater elements, for cooling the same, when the main steam supply is cut off, the pressure of the steam reaching the bore 7 will be insufficient to close the valves and the steam will pass through the internal passage 28 and 27 in the valve stem to the groove 26 and thence to the atmosphere through the duct 29 since, in these circumstances, groove and duct will register.

Variations of detail may be made within the spirit of my invention as set forth in the following claims:

1. In a device of the character described, a valve body having superposed passages adapted for connection to the ends of the engine cylinders, coaxial openings through the body between the passages and to the atmosphere from the upper passages, a bore communicating with the lower passage and in line with the coaxial openings, a piston in said bore provided with portions at one end adapted to close the aforesaid coaxial openings, an opening through the body to the other side of said piston adapted to be joined to the main steam supply, and a connection to the atmosphere from said last named opening said connection being closed when the coaxial openings are closed and open when said openings are open.

2. In a device of the character described, a valve body having superposed passages adapted for connection to the ends of the engine cylinder, coaxial openings through the body between the passages and to the atmosphere from the upper passages, a bore communicating with the lower passage and in line with the coaxial openings, a piston in said bore provided with portions at one end adapted to close the aforesaid coaxial openings, an opening through the body to the other side of said piston adapted to be joined to the main steam supply, and a connection to the atmosphere from said last named opening said connection being closed or open according to the position of the piston.

3. In a device of the character described, a valve body having superposed passages adapted for connection to the ends of the engine cylinder, coaxial openings through the body between the passages and to the atmosphere from the upper passages, a bore communicating with the lower passage and in line with the coaxial openings, a piston in said bore provided with portions at one end adapted to close the aforesaid coaxial openings, an opening through the body to the other side of said piston adapted to be joined to the main steam supply, an opening through the piston joining the steam supply connection to the opening between the superposed passages, and a valve in said piston opening arranged to be acted upon by the steam supply.

In testimony whereof I have hereunto set my hand in the presence of two subscribing witnesses.

HARRY ALEXANDER STENNING.

Witnesses:
T. H. GODBEHEAR,
W. A. CULLEN.